May 31, 1932.   H. T. AVERY   1,860,402

ALTITUDE CONTROL

Original Filed July 28, 1927   2 Sheets-Sheet 1

Inventor:
Harold T. Avery

Patented May 31, 1932

1,860,402

UNITED STATES PATENT OFFICE

HAROLD T. AVERY, OF OAKLAND, CALIFORNIA

ALTITUDE CONTROL

Application filed July 28, 1927, Serial No. 209,061. Renewed September 23, 1931.

This invention relates to a device capable of automatically bringing a vertically dirigible vehicle to a desired altitude and maintaining it at such altitude. It is particularly applicable to the control of airplanes and other aircraft, and also adaptable to submarine craft.

The objects of this invention are:

1. The provision in a vertically dirigible vehicle of means for automatically bringing the vehicle to any desired altitude, and for maintaining it at such altitude during operation.

2. The provision in such a vehicle of means for changing at will the altitude at which the vehicle is maintained.

3. The maintenance of longitudinal stability in such a vehicle throughout the automatic operation thereof.

4. The provision of a device which used in conjunction with means for locking the controls in neutral, and means for automatically steering the vehicle will give complete automatic control of any vertically dirigible vehicle, particularly of an airplane.

5. In such a device provision for maximum smoothness of operation in ascending or descending to a selected altitude, including means for bringing the vehicle smoothly to the proper angle of ascent or descent without passing said angle, and means for maintaining it substantially at said angle by slight movements of the vertical steering means approximately proportional to its deviation from said angle.

6. In such a device provision for maximum smoothness in operating at a given altitude including means for bringing the vehicle smoothly to the desired altitude without the tendency to pass same, and means for maintaining it substantially at the desired altitude by slight changes in the angle of inclination of the path of the vehicle, approximately proportional to the change of altitude of the vehicle.

7. The provision in such a device of means for varying the smoothness and quickness of response in automatic vertical steering.

8. In such a device the provision of means for limiting the operation of the vertical steering mechanism to a safe working range.

9. In such a device the provision of means for automatically leaving all battery circuits open when the vehicle is not operating.

10. The provision of means for conveniently rendering the automatic altitude control operative or inoperative at the option of the operator.

11. The provision of means for automatically controlling the vertical steering of an airplane without interfering with the direct control thereof.

12. Provision for utilizing the adjustable tail-plane of a airplane as the control surface operative during automatic vertical steering, and provision of direct as well as automatic electrical control for the tail-plane and of an incidence indicator visible to the pilot.

13. The provision of means for keeping the angle of ascent and descent of an airplane within a safe operating range during automatic vertical steering.

14. The provision of means by which a vertically dirigible vehicle may at the operator's option be maintained either at an altitude numerically selected or at an altitude physically chosen.

Other objects and advantages will hereinafter appear.

In addition to the above novel results, several constructional features of the invention will be apparent from the following specifications and claims. The invention consists in the novel combination of parts as hereinafter set forth.

The general principles of the invention and the relation of parts in a preferred embodiment of the invention as applied to aircraft, with particular reference to airplanes, is described in the following specification and illustrated in the accompanying drawings. The broad scope of the invention is particularly set forth in the appended claims.

1. CONTROL INSTRUMENTS AND CIRCUITS

Figures 1, 2:
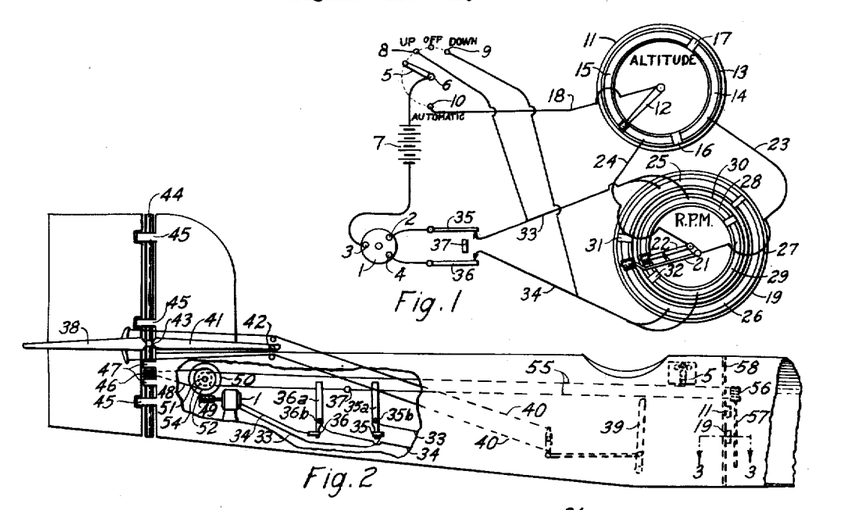
Fig. 1 is a diagrammatic representation of the electrical circuits and other essential parts pertaining thereto.
Fig. 2 is a longitudinal elevation of a portion of the fuselage of an airplane equipped with my device.

Fig. 1 illustrates diagrammatically the electrical circuits and related mechanism which I employ to control vertical steering and thus accomplish altitude control. Numeral 1 indicates an electric motor or other source of power electrically controlled and so connected to the tail-plane or other vertical steering means as to directly control the movements thereof. The arrangement is such that current between connection 2 and connection 3 will cause movement of the vertical steering means in a direction tending to cause an upward turn, while current between connection 4 and connection 3 will cause the opposite movement. In case an electric motor is used for this source of power this result may be obtained by a double winding of either the armature or the field.

Numeral 5 represents a controller handle movable on pivot 6, at which point it is electrically connected to battery 7. Motor 1 and the vertical steering mechanism operated by it, can be directly controlled by the operator of the vehicle through the use of this controller, the moving of the controller handle onto contact 8 causing the steering means to move in the direction of an upward turn, and moving it onto contact 9 causing the opposite movement. By moving controller handle 5 onto contact 10 automatic vertical steering and altitude control becomes effective.

Numeral 11 represents an instrument capable of indicating altitude, ordinarily called an altimeter. In the particular embodiment indicated an increase in altitude causes indicating hand 12 to rotate in a counter-clockwise direction with respect to altimeter case 103, and a decrease in altitude causes it to move in the opposite direction this relative displacement being produced by well known means not herein described. Hand 12 is directly connected, electrically, to contact 10, by wire 18, and acts as a trolley travelling on ring 13, which carries two conductive arc-shaped plates 14 and 15 separated from each other by two narrow insulation strips 16 and 17. For automatic altitude control, strip 16 is placed at the position that hand 12 will assume to indicate the desired altitude. Hand 12 will then contact with plate 14 when the vehicle is above that altitude, and with plate 15 when it is below that altitude.

Numeral 19 represents an instrument capable of indicating the incidence angle or rate of climb or descent of the vehicle, or of indicating some factor dependent upon such climb or descent. In my preferred embodiment I have chosen to utilize the tachometer that indicates the engine speed for this purpose, as in an airplane the engine speed is very responsive to changes in the angle of climb, and in climbing and descending one of the important considerations is to keep the engine speed within proper bounds. Other types of inclinometer or rate-of-climb indicator could be used in the same general manner and to the same general purpose as I choose to use the tachometer.

Tachometer 19 has an indicating hand 20 adapted to be rotatably positioned in a well known manner with respect to the tachometer case 72 so as to indicate engine speed. Hand 20 carries two insulated conductive strips 21 and 22, connected by wires 23 and 24, respectively, to plates 14 and 15, respectively, on altimeter 11. Strip 21 acts as a trolley contacting with plates 25 and 26 of ring 27, similar to plates 14 and 15 of ring 13, while strip 22 similarly contacts with plates 28 and 29 of ring 30. Insulation strip 32 of ring 30 is placed opposite the position that hand 20 assumes in indicating the engine speed corresponding to the maximum angle of climb that it is considered desirable for the vehicle to assume during automatic operation, while insulation strip 31 of ring 27 is similarly set to correspond to the engine speed for the desired maximum angle of descent. Trolley 21 will therefore contact with plate 25 if the airplane is descending at such an angle as to bring the engine speed in excess of that for which strip 31 is set, and will contact with plate 26 if the descent is so flattened as to bring the engine speed below that set. Similarly trolley 22 will contact with plate 29 or 28, depending upon whether the angle of ascent is greater or less than that which brings the engine to the speed for which strip 32 is set. Plates 25 and 28 are electrically connected by wire 33 to connection 2 on motor 1, while plates 26 and 29 are similarly connected by wire 34 to connection 4.

In order to allow of limiting the range of motion of the vertical steering means to that which is considered safe for automatic operation and to that which the mechanical construction will properly allow, cut-out switches 35 and 36 are inserted in wires 33 and 34, respectively, and arranged to be operated by bumper 37 which is actuated by the vertical steering mechanism utilized during automatic operation in such a manner that switch 35 will be opened when the vertical steering mechanism is set for the maximum upward turn, and switch 36 similarly opened when it is set for the maximum downward turn.

Thus whenever controller handle 5 is on contact 10, its "Automatic" position, altimeter hand 12 is connected to battery 7 and energizes tachometer trolley 22 if the plane is below the critical altitude set on the altimeter, and trolley 21 if it is above such altitude. Therefore, when the plane is below altitude the ascending engine speed, to which strip 32 is set, controls, while when the plane is above altitude the descending engine speed, to which strip 31 is set, controls. Thus if the plane for any reason heads upward from either its proper ascending or descending path so as to bring the engine speed below the particular speed that may be controlling, current is turned onto motor 1 at connection 4 moving the vertical steering mechanism in the proper direction for a downward turn, while the increase in engine speed incidental to heading downward from either of these paths will turn the current onto connection 2 and cause the opposite motion of the vertical steering mechanism. If strip 32 is set to a speed indication approximating that which the engine assumes when the plane is climbing at approximately its maximum safe angle of climb, the plane will be constrained to climb at this angle so long as it is below altitude, any tendency to climb at a flatter or steeper angle being counteracted in the manner above described. Similarly if it is above altitude it will be constrained to descend at the angle corresponding to the descending speed to which strip 31 is set.

2. TAIL-PLANE OPERATION

In airplane construction it is customary to accomplish vertical steering through the use of a horizontal rudder or elevator 38 (Fig. 2), controlled by manual control means 39 through wires 40, 40. Many airplanes also have an adjustable tail-plane similar to tail-plane 41. In the embodiment illustrated in Fig. 2, tail-plane 41 is pivotally mounted on the fuselage on horizontal axis 42 near the front end of the tail-plane. The rear end of the tail-plane is supported by horizontal axis 43, which is rigid with vertical shaft 44, which in turn is slidably mounted in guides 45. A portion of shaft 44 is threaded to mesh with sleeve 46 which is mounted upon the shaft and vertically restrained between guides 47 rigid with the fuselage. The rotation of sleeve 46 will feed shaft 44 up or down with respect to the fuselage thereby changing the incidence angle of tail-plane 41. The rotation of sleeve 46 is accomplished by means of wire 48 which passes around the sleeve as a drum, and is fastened to it in a manner to prevent its sliding upon the sleeve. In existing embodiments the actuation of wire 48 is ordinarily accomplished by manual operation. In my embodiment I provide, instead, for its actuation by motor 1, through the action of worm 49 rigid with the shaft of the motor and meshing with worm gear 50 which in turn is rigid with shaft 51, as also is drum 52 around which wire 48 is wound. Thus the rotation of motor 1 in one direction will raise the rear end of tail-plane 41, while the opposite rotation will lower it.

In existing airplanes the adjustment of the tail-plane is utilized largely to take the load off of the controls during straight-away flying. In the preferred embodiment of my invention I propose to have the vertical rudder locked in its neutral position during automatic control by means similar to those covered by my co-pending application #132,686 for "airplane control" filed August 31, 1926, and to utilize the tail-plane as the only vertical steering means operative during such automatic control. I provide electrically through controller 5 the same degree of direct control of the tail-plane that the operator has heretofore had mechanically, and I provide in addition a visible indication to the operator of his tail-plane position, by means of pointer 53 (Figs. 3 and 6), the operation of which is accomplished as follows:

Rigid with shaft 51, and therefore moving in unison with tail-plane 41 is a drum 54, (Fig. 2), around which is wound wire 55, which also passes through suitable guide pulleys and thence around drum 56 rigid with shaft 57 which is mounted vertically parallel to instrument board 58, just back of the board (that is on the side away from the operator). A portion of shaft 57 is threaded, and meshing with it is a member 59, longitudinally slidable, but constrained so as not to rotate with shaft 57 by means of shaft 60 rigid with member 59 and extending between vertical guides 61 (see Figs. 3 and 7). Rigid with member 59 is pointer 53 extending out through slot 62 in instrument board 58, and reading against scale 63 on said board (see Figs. 3 and 6). Since the rotation of drum 54 is proportional to the movement of the tail-plane, the rotation of shaft 57 and the longitudinal motion of member 59 and pointer 53 will also be proportional to that movement. Therefore by properly graduating scale 63 the incidence angle of the tail-plane may be directly indicated.

Firmly attached to wire 55, and therefore moving in unison with the tail-plane, is bumper 37 which is so arranged as to engage arm 35a as the tail-plane comes into the extreme upper position which safe automatic operation and the mechanical construction of the tail-plane apparatus will allow, and to rotate said arm on fixed pivot 35b so as to open cut-out switch 35, thereby preventing further upward rotation of the tail-plane. The arrangement is such that as the tail-plane comes into its extreme lower position bumper 37 will engage a similar arm 36a, rotating same on fixed pivot 36b, and opening cut-out switch 36 so as to prevent further downward movement of the tail-plane.

3. INSTRUMENTAL CORRECTIONS TO OBTAIN SMOOTHNESS (a) *Necessity for corrections*

The mechanism as described above provides the necessary mechanical and electrical means for establishing automatic vertical steering and altitude control, but it lacks the necessary smoothness and operating characteristics to function satisfactorily of itself. For instance in ascending toward the altitude set, the mechanism is controlled by the ascending engine speed set on the tachometer. If the craft gets to ascending a little too sharply the engine speed will drop, trolley 22 contact with plate 29, turning the current onto the motor a connection 4, and lowering the rear end of tail-plane 41. Unless the range of motion should become so great as to break circuit 34 at cut-out switch 36, the current would remain on the motor, and the tail-plane continue to lower until the direction of the craft's ascent was changed sufficiently to bring about the proper increase in engine speed. At this juncture trolley 22 would move onto insulation strip 32 and break the circuit, but the tail-plane being set by this time in a position to produce a decided downward turn, would continue to turn the plane downward until the resulting increase in speed would bring trolley 22 onto plate 28 and start raising the tail-plane. The craft would however, continue to turn continually further downward until the tail-plane was raised back to its effective neutral position, by which time an upward turn would have to be set up to bring the craft onto its proper angle of ascent. Thus a very small deviation to one side of the proper angular course for ascending would produce a greater deviation to the other side, and the net effect of the control would be to keep the craft oscillating up and down across the proper course instead of settling onto it.

In descending exactly the same effect would be produced, while when flying at approximately the altitude set the unstable effect would be even more pronounced, in that when displaced slightly from the proper altitude the tail-plane would continue to move from neutral not only until a distinct vertical change in course and change in engine speed was accomplished, but until the craft moved along the new direction far enough to bring about the necessary change in altitude or until the craft reached its limiting engine speed. Except with a very sensitive altimeter the tendency would be to keep the craft oscillating up and down between limiting engine speeds, and even with a very sensitive altimeter, the oscillating effect would still remain in a lesser degree.

(b) *Incidence correction to tachometer*

The unstable and oscillating effect in ascending and descending is over-come, and the mechanism made to function so as to steady the craft onto the proper ascending and descending courses by automatically introducing what I choose to term an "incidence correction" into the control sets of the tachometer. This consists in automatically changing each "set" on the tachometer by an amount proportional to the change in incidence angle of the tail-plane, (a raise in the tail-plane causing insulation strips 31 and 32 to be set opposite higher engine speeds).

With this arrangement if the craft is ascending and starts to ascend at a little too steep an angle, the rear end of the tail-plane will be lowered as previously described, but the movement of the tail-plane will automatically decrease the critical engine speed. As soon as the critical speed set drops to the actual engine speed, trolley 22 moves onto insulation strip 32 and breaks the circuit. If the engine speed has departed only slightly from the critical speed only a slight movement of the tail-plane will be possible before the circuit is thus broken. In any case the amount of movement of the tail-plane will be proportional to the amount of the departure of the engine speed from the critical speed. Since the tail-plane will have been lowered from its neutral position in bringing about the incidence correction mentioned, this lowering will produce a downward turn of the craft and an increase in engine speed. This increase will move trolley 22 onto plate 28 and start raising the tail-plane thus lessening the rate of increase in engine speed and also increasing the critical speed, so that the actual engine speed will continue to approach the critical speed originally set more and more gradually, and the corrected critical speed will approach in like proportion the original set, with the result that barring new disturbances from course the craft will smoothly settle onto the desired angle of climb just as the tail-plane reaches its neutral position and the critical speed its original set. The introduction of the incidence correction will similarly smooth out the return to proper angle from any departure in either direction from either the ascending or descending critical speeds.

Figure 3:
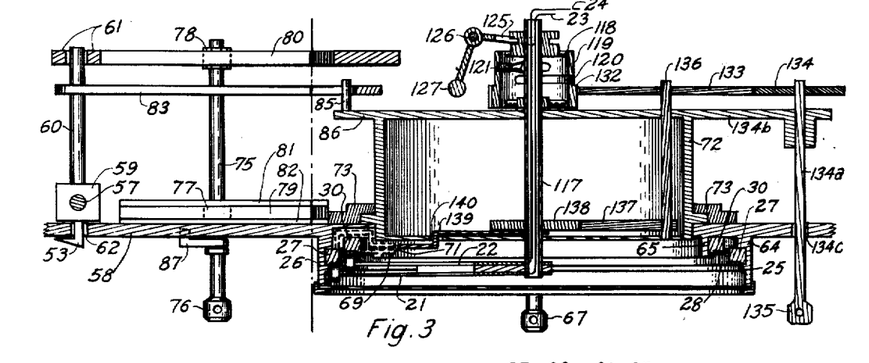
Fig. 3 is a horizontal section through the instrument board taken on line 3—3 of Fig. 2 and Fig. 6.
Figures 6, 7, 8:
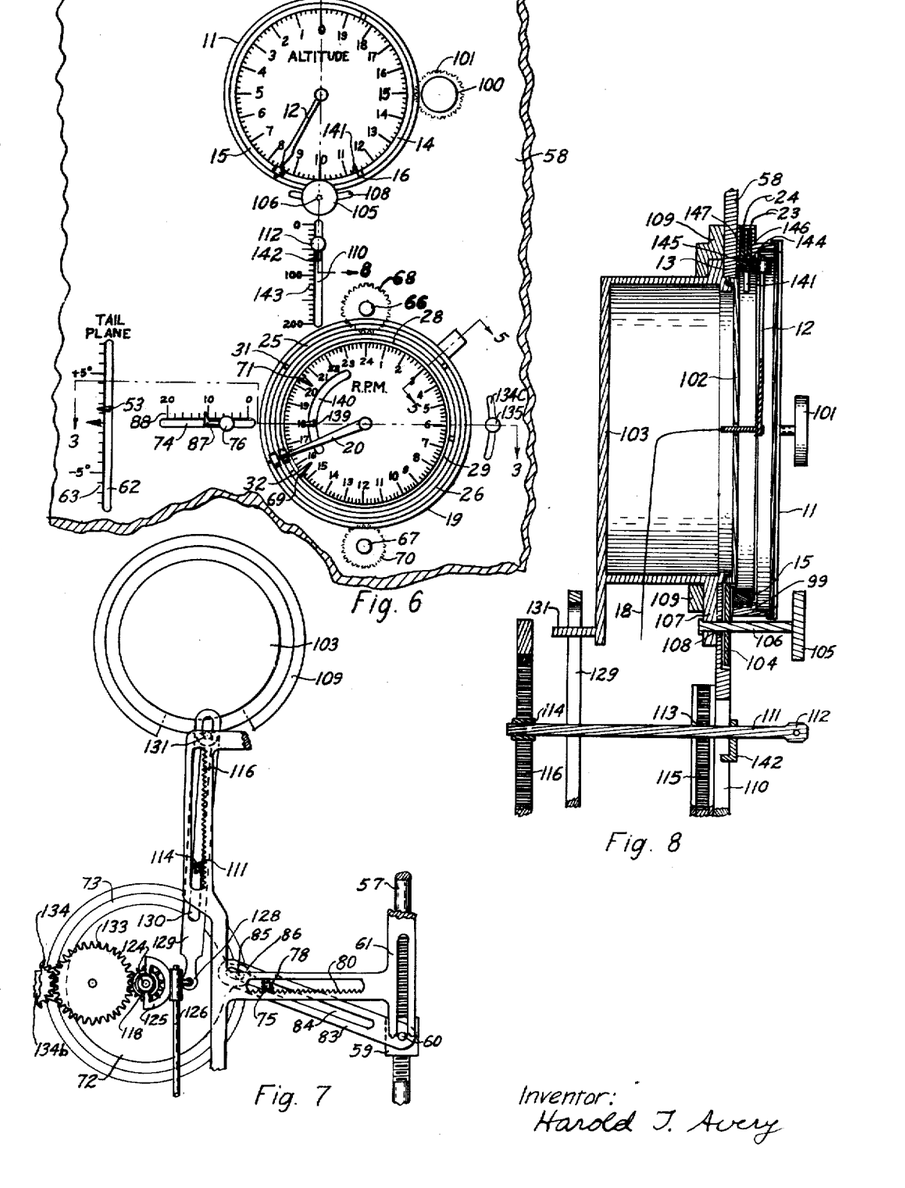
Fig. 6 is a front elevation of a portion of the instrument board. (Note.—The front of the instrument board is toward the rear of the airplane, and therefore this view is looking toward the front of the airplane.)
Fig. 7 is a rear elevation of the same portion of the instrument board as shown in Fig. 6.
Fig. 8 is a vertical section through the altimeter, taken on line 8—8, Fig. 6.

In my preferred embodiment I provide for the introduction of this incidence correction as follows:

Guide 64 retaining ring 27, and guide 65 retaining ring 30 are both rigid with instrument board 58. (See Fig. 3.) These rings may be set to the proper ascending and descending speeds, respectively, by the use of capstan heads 66 and 67, respectively. (See Fig. 6.) Rigid with capstan head 66 is pinion 68 which meshes with teeth on the circumference of ring 30 so that by the rotation of the capstan head the ring may be rotated until insulation strip 32 is placed opposite the desired speed. This set may be accurately gauged by means of pointer 69, rigid with ring 30 and extending out into a position to be read against the instrument scale (see Figs. 3 and 6). Rigid with capstan head 67 is pinion 70, which similarly operates ring 27, and pointer 71 is provided, rigid with ring 27 and extending back of ring 30 and out to the scale, to accurately indicate the set of insulation strip 31. With this arrangement rings 27 and 30 will remain fixed with relation to the instrument board except when the set is being altered by means of capstan heads 67 and 66. Tachometer case 72, on the other hand, is supported by guide 73, (see Fig. 3), so that it may be rotated about its central axis, and provision is made for it to be automatically rotated in amounts proportional to the movement of the tail-plane, as follows:

Extending horizontally through slot 74 in the instrument board is shaft 75 on the outer end of which is capstan head 76, and also rigid with which are pinions 77 and 78 (see Figs. 3 and 6). These pinions mesh, respectively, with racks 79 and 80, which are rigid with the instrument board, so that the rotation of capstan head 76 moves shaft 75 laterally parallel to itself. Pinion 77 is laterally restrained by guides 81 and 82, and sufficient friction is provided to retain the shaft fixed except when being moved by the rotation of the capstan head. Pivoted to shaft 60, which is rigid with member 59 and therefore moves up and down in proportion to the change of incidence angle of the tail-plane, is member 83 having a longitudinal slot 84 through which extends shaft 75 and pin 85 rigid with projection 86 of the tachometer case (see Fig. 7). Member 83 acts as a lever rocking over shaft 75 as a pivot, and moving pin 85 down or up in proportion to the up or down movement of member 60, and therefore in proportion to the up or down movement of the tail-plane. With as small an angular displacement as that involved in introducing this correction the movement of pin 85 will impart to tachometer case 72 an angular displacement in almost exact proportion to the change in the incidence angle of the tail-plane.

By utilizing capstan head 76 to change the lateral position of shaft 75 the ratio between the angular displacement of the tachometer case and that of the tail-plane may be varied at will to that which gives the desired degree of smoothness and quickness of response for any particular craft and operating conditions. As a convenient index to the ratio set, I provide pointer 87, pivoted on shaft 75, guided by horizontal slot 74 and reading against fixed scale 88. (See Figs. 3 and 6.)

The operating mechanism of the tachometer (which may be of a well known type and is not herein detailed) is mounted in case 72 in such a manner that, for each engine speed, it fixes the position of hand 20 with respect to the case and the graduated scale thereof, which in the embodiment indicated increases in a clockwise direction. A lowering of the tail-plane will, with the arrangement indicated, cause a clockwise rotation of case 72, which will produce an equal displacement of hand 20, except as changes in the speed of the engine may from time to time alter the position of the hand with respect to case 72. Rings 27 and 30 remaining fixed with respect to the instrument board, this rotation of the case is equivalent to a counter-clockwise rotation of the rings with respect to the tachometer, causing the insulation strips to be placed opposite lower engine speeds.

Figure 5:
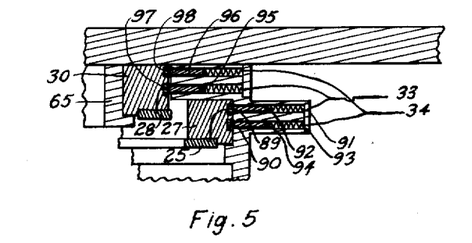
Fig. 5 is a cross-section of the brushes on the engine speed indicator, taken on line 5—5, Fig. 6.

I provide for electrical connection to the contact plates on the adjustable rings in the manner indicated in Fig. 5. Passing around the outer circumference of ring 27 are two conductor rings 89 and 90 connected to plates 25 and 26, respectively. Held against ring 89 by spring 91 is brush 92, while similarly held against ring 90 by spring 93 is brush 94. In a similar manner brushes 95 and 96 contact with conductive rings 97 and 98, which are in the outer circumference of ring 30 and connected respectively to plates 28 and 29. Brushes 91 and 95 are connected to wire 33, while brushes 92 and 96 are connected to wire 34. Thus each of the contact plates is continually connected to its proper wire regardless of the movement of the ring on which it is mounted.

(c) *Rate-of-climb correction to altimeter*

The unstable and oscillating effect which would otherwise be present in the automatic control of a craft at fixed altitude is overcome, and the mechanism made to function so as to steady the craft onto the altitude set, by automatically introducing what I choose to term a "rate-of-climb correction"

into the control set of the altimeter. This consists in automatically changing the "set" on the altimeter by an amount proportional to the change in the angle of climb, which in my preferred embodiment is measured by change in engine speed, (an increase in engine speed causing insulation strip 16 to be set opposite a higher altitude reading).

When the craft is flying at substantially the altitude set on the altimeter, the tendency to oscillate up and down between maximum and minimum engine speeds is eliminated by the introduction of this rate-of-climb correction. If, when flying under such conditions the craft becomes displaced slightly below the altitude set, trolley 12 will contact with plate 15 energizing trolley 22 on the tachometer, which, as the engine speed is intermediate between ascending and descending speeds will be in contact with plate 28. This starts the tail-plane moving upward, the craft to turning upward, and the engine speed to correspondingly decreasing. A slight decrease in the engine speed will decrease the altitude "set" sufficiently to bring trolley 12 onto insulation strip 16 thus breaking the circuit and stopping the upward movement of the tail-plane. The tail-plane being now set for an upward turn will continue to turn the craft upward, still further reducing the engine speed, with the result that the altitude "set" will be still further lowered and trolley 12 brought onto plate 14, energizing trolley 21, which is in contact with plate 26, thereby closing the circuit to the motor at connection 4 and starting to lower the tail-plane. As soon as the tail-plane is lowered past its neutral position it will start a downward turn, which will result in an increase in engine speed and consequent increase in altitude "set." This increase in altitude "set" will again bring trolley 12 onto insulation strip 16, halting the lowering of the tail-plane, and the continued increase in engine speed and altitude "set" due to the downward turn now instituted will cause trolley 12 to move onto plate 15 and start raising the tail-plane toward its neutral position.

Barring new disturbances, the craft will from this point on describe a smoothly tapered curve tangent to a horizontal course at the desired altitude, for the trolley will alternate between plates 14 and 15 in such a manner that the revised altitude set will be identical with the actual altitude of the craft, and the actual engine speed will be that corresponding to the altitude set, which will gradually approach normal horizontal flying speed in proportion as the altitude approaches that originally set, meaning that the angle of ascent of the craft will approach the horizontal in proportion to its approach to the desired altitude. That this will be true will be apparent from a study of the inter-functioning of the various parts, any tendency for the tail-plane to straighten out too quickly and carry the craft upward on too flat a curve resulting in an actual increase in elevation out of proportion to the increase in engine speed and altitude set, bringing trolley 12 onto plate 14 and lowering the tail-plane, while any tendency to curve too sharply toward the horizontal will result in an increase in engine speed, and consequently in altitude set, out of proportion to the actual increase in altitude, bringing trolley 12 onto plate 15 and raising the tail-plane.

When the craft is ascending toward the altitude set from some altitude considerably lower it will be maintained at the proper angle of ascent by the ascending engine speed set on the tachometer as previously described, and will be so controlled until the craft reaches the revised altitude set of the altimeter. This revised set will be below the desired altitude on account of the ascending engine speed being less than that of normal horizontal flight. As soon as this altitude is reached, trolley 12 will pass off of plate 15 and then onto plate 14, starting a lowering of the tail-plane which will shortly be stopped when the increase in engine speed on account of the flattening of the course causes the altitude set to catch up with the actual altitude. From that point on the craft will describe a smoothly flattening tapered curve tangent to a horizontal line at the desired altitude in exactly the manner previously described in the case of small displacements from course when flying at the desired altitude. In descending from one altitude to a new desired altitude considerably lower, the craft will upon approaching the new altitude be turned to the horizontal in much the same manner, the corrected altitude set in this case, at which the craft starts to flatten its course toward horizontal, being approximately as far above the desired altitude as the corrected set is below the desired altitude in the case of ascent.

Figure 4:
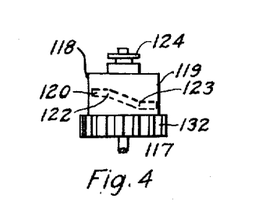
Fig. 4 is a plan of the altimeter-corrector with which the engine speed indicator is equipped.

In my preferred embodiment I provide for the introduction of this rate-of-climb correction as follows:

Like rings 27 and 30 of the tachometer, ring 13 of the altimeter is retained by fixed guide 99, (see Fig. 8), in a fixed relation to the instrument board except when being set by means of pinion 100 and pinion head 101, which serve to position ring 13 just as pinion 70 and capstan head 67 serve to position ring 27. In the altimeter, graduated face 102 may be adjusted with respect to case 103, to allow for changes of barometric pressure, by means of pinion 104 and pinion head 105 both rigid with shaft 106, which is mounted on projection 107 rigid with case 103 and extends through slot 108 in the instrument board so arranged as to allow of as much rotation of case 103 with respect to the instrument board as may be necessary in introducing the rate-of-climb correction. (See Figs. 8 and 6.) Altimeter case 103 is rotatably supported in guide 109, and arrangements made to automatically rotate it in proportion to the change of engine speed, as follows:

Extending horizontally through vertical slot 110 in the instrument board is shaft 111, rigid with which are capstan head 112 and pinions 113 and 114 meshing with fixed vertical racks 115 and 116, respectively, in order to adjust the position of shaft 111 in a manner similar to that in which the position of shaft 75 is adjusted. Central shaft 117 of the tachometer, with which hand 20 is rigid consists of a hollow sleeve extending out through the back of the case as indicated in Fig. 3. Slidably mounted on the rear portion of this sleeve is altimeter-corrector 118 shown in plan in Fig. 4 and in cross-section in Fig. 3. The main body of this corrector consists of cylinder 119 concentric with sleeve 117, and having on its inner face a groove 120 into which extends projection 121 rigid with sleeve 117. The portion of groove 120 into which projection 121 extends at lower engine speeds passes circumferentially around cylinder 119 to point 122 near the lower limit of the normal working range of speeds. From thence the groove passes diagonally forward around the cylinder to point 123 near the upper range of working speeds, and thence continues circumferentially around the cylinder again to a point overlapping the point of beginning. The arrangement is such that for engine speeds below that which brings projection 121 to point 122 the corrector is held close in to the tachometer case, while for higher speeds it moves proportionally away until for speeds higher than that which brings projection 121 to point 123, it will be held at a fixed outer position. Rigid with cylinder 119 is guide collar 124, the longitudinal motion of which actuates shifting fork 125 and rotates it on its fixed axis 126 thereby imparting lateral motion to ball 127 which is rigidly attached to the shifting fork. Ball 127 fits into socket joint 128 on the bottom of member 129, (Fig. 7), through slot 130 of which extends shaft 111 and pin 131 rigid with altimeter case 103, so that member 129 pivoting on shaft 111 imparts to case 103 an angular motion almost exactly proportional to the amount of shift of corrector 118.

In order to allow of centering portion 122—123 of groove 120 opposite the normal flying speed of the particular engine with which it may be used, and to at the same time effectually restrain it from rotating except in resetting, gear 132 is provided rigid with cylinder 119 and meshing with gear 133 which is arranged to be actuated by pinion 134 rigid with capstan head 135. In order to visibly indicate the speed for which the center of this portion is set, gear 133 is made rigid with shaft 136 to which is fastened segment 137 having radius equal to gear 133 and meshing with gear 138, which is loosely mounted on shaft 117 and has a radius equal to gear 132, so that it will move in unison with said gear and cylinder 119. Rigid with gear 138 is pointer 139 extending through slot 140 in the face of the case and arranged for pointing to the engine speed scale. At each setting of cylinder 119, each point on the cylinder occupies a definite relation to the engine speed scale. Therefore projection 121 will occupy a given point in groove 120 at an engine speed which will be fixed by the setting of cylinder 119. Pointer 139 could obviously be attached to gear 138 so as to point to the engine speed at which projection 121 reaches any given point in groove 120. For instance, if projection 121 is constructed parallel to hand 20, and pointer 139 parallel to the radius through point 122, pointer 139 will always indicate the engine speed at which projection 121 will occupy point 122. However, to give a more convenient indication for centering portion 122—123 of groove 120, pointer 139 is, in my preferred embodiment, attached to gear 138 at such an angle that it always points to the engine speed at which projection 121 will occupy a position midway between points 122 and 123. Pinion 134 is fastened to capstan head 135 by shaft 134a which is supported by projection 134b rigid with tachometer case 72, and which extends through slot 134c in the instrument board, so arranged as to allow of the necessary angular displacement of the tachometer case.

It will be observed that with the arrangements as outlined, so long as the engine speeds remain within the usual working range, the altimeter case, and with it face 102, will be rotated by an amount proportional to the change in engine speed, an increase in engine speed causing a clockwise rotation as viewed from the face of the instrument, while ring 13 will remain fixed, thereby bringing insulation strip 16, and pointer 141 which shows its position, opposite a higher altitude setting. Hand 12, being positioned with respect to case 103 in the manner previously mentioned, will be rotated through the same angle as the case, except as changes in the altitude of the craft may from time to time alter the position of the hand with respect to the case.

The amount of altitude correction for a given change in engine speed may be adjusted to that which gives the best results with any particular craft, by rotating capstan head 112 so as to adjust the position of shaft 111, the exact set of which may be conveniently read by pointer 142 which is pivotally attached to shaft 111, guided in groove 110, and arranged to read against fixed scale 143. (Fig. 6.)

I provide ring 13 with conductive rings and brushes for making electrical contact with plates 14 and 15, similar to those provided in connection with the tachometer rings. Conductive rings 144 and 145 are connected to plates 14 and 15 respectively, and contact with brushes 146 and 147 respectively, which in turn are connected respectively to wires 23 and 24.

4. METHOD OF OPERATION

This altitude control device becomes of maximum usefulness only by using it in conjunction with an automatic steering device such as that covered by my co-pending application No. 200,630, filed June 22, 1927, and if the craft be an airplane in conjunction with a device for eliminating use of the hand controls, such as that covered by my co-pending application No. 132,686, filed August 31, 1926. By using the altitude control device in conjunction with these other devices, complete automatic control results, and it becomes possible for the aviator to let go of all controls for an indefinite period of time, and have the craft maintained on its proper course and at the proper altitude; complete longitudinal stability, which would otherwise be precariously lacking for long periods of completely automatic operation, being supplied by the use of the altitude control device.

Upon installing this device on a new craft, or especially on a new type of craft, the first essential is to set pointers 69 and 71 to the proper ascending and descending speed, respectively, for the particular craft and engine, and pointer 139 to the proper operating speed for level flight. The ascending and descending speeds used should be well within a safe working range, so that the departure from the speed set during operation will not allow the actual speed to go outside of a safe range. If the speed to which pointer 139 is set does not happen to be exactly the engine speed for horizontal flight under the particular conditions under which the craft may operate, the stability will not be affected thereby, the only results being that the rate-of-climb correction will apply to a greater range of altitudes to one side of horizontal flight than to the other, and that when the craft settles onto horizontal flight, the altitude will be corrected slightly off from the altitude set.

The next essential is to adjust capstan heads 76 and 112 to give the proper degree of smoothness and sensitiveness to the operation. Capstan head 76 should be adjusted during ascending and descending flight, as it is then that its effect is operative, and capstan head 112 adjusted during horizontal flight. If these sets should be made so as to give too small a relative correction oscillatory instability such as characterizes uncorrected steering would still be present to a certain degree, while if they are made unduly large, the return of the craft to the proper angle of flight will be unnecessarily slow.

After all of these sets and adjustments have been made to suit the particular craft is should not become necessary to alter them, except perhaps for some marked change in operating conditions or type of response desired. All that should be necessary in connection with the ordinary operation of the craft is to set pointer 141 by means of pinion head 101, to the altitude at which it is desired to have the craft operate, give the engine its normal set of throttle, move controller handle 5 onto contact 10, lock the elevator in its neutral position, and the craft will ascend or descend, as the case may be, to the altitude set and continue to operate at that altitude.

While the principal purpose of the altitude control device will, in all probability, be to establish longitudinal stability at the general level of intended flight, for which purpose the difference of a few hundred feet in the exact altitude of flight is of little consequence, it may at times be used for purposes for which the accuracy desired will require taking into account the rate-of-climb correction to the altimeter in setting the altitude desired. If the altitude is set while the craft is flying at substantially the engine speed to which pointer 139 is set there is no correction to be made, but if the set is made with the engine idle or below working speed, the set would have to be made lower than the desired altitude by the altitude range over which the rate-of-climb correction is effective to each side of the desired altitude, which amount is one half of the total altitude range affected by the altimeter-corrector. For convenience in allowing for this in making an altitude set, scale 143 may be so graduated that pointer 142 will indicate on the scale the amount of this correction.

In setting the engine speeds the effect of incidence correction may be eliminated by bringing the tail-plane to its zero position by the use of controller 5 on contact 8 and 9. Scale 88 may also be graduated so as to indicate R. P. M. per degree change of incidence angle so that if occasion should arise to adjust an engine speed setting with the tail-plane out of its neutral position the effect of the incidence correction could be accurately allowed for.

It will be observed that I have provided capstan heads for making the adjustments necessary to adapt the apparatus to a particular craft, and to give it the desired degree of smoothness and quickness of response, but which would not ordinarily have to be altered during the operation of the craft, while I have provided pinion heads of the thumb screw type for the pinion adjustments that would be subject to more frequent use during the operation of the craft, thereby helping to insure against accidental change of any of the more permanent adjustments.

With any mechanism operated by electric battery like the present apparatus it is essential that arrangements be made to leave all battery circuits open when the apparatus is idle in order to avoid running down the battery. With the mechanism as outlined, moving controller 5 onto its "off" position will leave all circuits open, while if the controller should be left on contacts 8, 9, or 10, while the craft were idle the circuits would be automatically left open, for if either circuit were closed, the tail-plane would continue to move until either cut-out switch 35 or 36 were opened to break the circuit, whereupon the craft not being amenable to the movement of the tail-plane no changes in engine speed or altitude would result to close any new circuit, and all circuits would be automatically left open.

By utilizing the tail-plane, instead of the elevator for automatic vertical steering, and by using a device such as that covered by my co-pending application No. 132,686, above mentioned, to hold the elevator in its neutral position during automatic control, automatic altitude control and vertical steering is accomplished without interfering with the direct control of the plane, for if at any time the pilot wishes to resume direct control all he has to do is to again render the elevator responsive to the control-stick and he has full vertical control, for the maximum displacement of the tail-plane is so slight as compared to that of the elevator, that the vertical rudder can produce any desired turn regardless of the position of the tail-plane. In passing to direct control the pilot should, to obtain easiest and fullest control, switch controller 5 off of contact 10 and then operate it on contacts 8 and 9 so as to bring the tail-plane into the position to give the least load on the controls for horizontal flying, but as above noted he will have complete vertical control without stopping to do this.

In the operation of this device it is anticipated that the pilot will most frequently choose numerically in advance the altitude at which he wishes to fly, but it is possible that under certain circumstances he may wish to merely give the craft longitudinal stability for automatic flight at the altitude at which he finds himself, or that he may wish to fly at an altitude visibly chosen in respect to certain objects but not numerically known in advance. All that is necessary in this case is for the pilot to bring the craft to the desired altitude if not already there, which may be done either by direct control or by automatic control setting the altitude considerably beyond that desired and resetting when the desired altitude is visibly seen to be reached, and with the craft at the desired altitude, to set pointer 141 to coincide with hand 12, making allowance for the rate-of-climb correction if the set is made with the craft sharply climbing or descending. The feature of my preferred embodiment which makes for such easy setting by physical selection is the proximity to each other of the pointers indicating actual altitude and altitude set.

I believe that the greatest advantage of this altitude control device, and particularly of the combination of devices giving complete automatic control as outlined above, will be realized in flying considerable distances, as in cross-country or trans-oceanic flights. With the combination of devices mentioned it is possible for a pilot to scale from a map his desired course, note the highest elevations encountered on the course, set his steering device for the course, his altitude control for an elevation to safely clear the highest mountains on his course, and as soon as he has gotten well clear of the ground throw his craft into automatic control and not have to touch the controls until he approaches his destination.

What I claim is:

1. In a dirigible vehicle, the combination of a member positioned by the inclination of the path of the vehicle to the horizontal, a member positioned by the altitude of the vehicle, an electric trolley mechanically actuated by said latter member, two contact plates insulated from each other and so arranged that the trolley will contact with one plate when the vehicle is above a certain altitude and with the other when it is below said altitude, and means actuated by the first mentioned member to so displace the insulated junction of the two plates with respect to the range of motion of the electric trolley as to alter the altitude at which the trolley passes over said junction approximately in proportion to the change of inclination of the path of the vehicle.

2. In a dirigible vehicle the combination of an instrument having a shaft rotatably positioned by the inclination of the path of the vehicle to the horizontal, a cylinder rotatably restrained and longitudinally slidable having a spiral groove, a projection rigid with the above mentioned shaft extending into said groove in such a manner that the rotation of the shaft will cause a longitudinal displacement of the cylinder, a lever actuated by the movement of the cylinder, an electric trolley positioned by the altitude of the vehicle, two contact plates arranged to be connected respectively to the trolley as the vehicle occupies altitudes on opposite sides of a critical altitude, and means actuated by the above mentioned lever to cause a displacement of the contact plates with reference to the trolley apparatus such as to produce a change in the altitude range within which the trolley contacts with each plate.

3. In an engine-propelled dirigible vehicle, the combination of an element positioned by the altitude of the vehicle, two members so arranged that the element will contact with one when the vehicle is below a certain altitude, and with the other when above said altitude, and means actuated by the engine to produce a relative displacement of the members with respect to the element in a manner adapted to alter, in proportion to the change in engine speed, the altitude above which the element will contact with one member and below which it will contact with the other.

4. In a dirigible vehicle the combination of a cylinder having a spiral groove, a projection extending into said cylinder, means adapted to rotatably position one of said members in response to the inclination of the vehicle, and means to rotatably restrain the other member so that the positioning of the one will cause displacement of the other in the direction of the axis of the cylinder.

5. In an engine-propelled dirigible vehicle the combination of an instrument having a shaft rotatably positioned by the engine speed, a projection rigid with said shaft, a longitudinally slidable cylinder concentric with said shaft, a groove in said cylinder, into which said projection extends, so shaped that in traversing the portion of its circumference corresponding to a limited range of engine speeds the projection will cause a certain longitudinal displacement of the cylinder, a pinion adapted to rotate the cylinder to vary the engine speeds included in said limited range and to rotatably restrain the cylinder.

6. In a dirigible vehicle the combination of mechanism adapted to control vertical steering, including an electrically conductive member arranged to contact selectively with one or the other of two other members as said first named member is to one side or the other of an insulation separating said two members, means adapted to prevent oscillatory vertical steering including mechanism for automatically varying the position of said insulation with respect to the first mentoned conductive member, said mechanism including an actuating member acting upon a lever which is arranged to act upon another member the position of which affects the position of the insulation above mentioned, and means adapted to alter the ratio of the change in the position of the insulation to the movement of the actuating member by altering the relative length of the effective lever arms of the above mentioned lever.

7. In a dirigible vehicle, the combination of an altitude indicator, mechanism for setting an element to correspond to a certain altitude marking on said indicator, a member positioned by the inclination of the path of the vehicle to the horizontal, a lever actuated thereby, a member actuated by the lever and adapted to cause a relative displacement of the above mentioned element with respect to the indicator, and means for moving the pivotal axis of the lever so as to alter the amount of movement transmitted to the last mentioned member.

8. In an engine-propelled dirigible vehicle the combination of a member positioned by the engine speed, mechanism actuated thereby adapted to control the vertical steering of the vehicle, means in conjunction with said mechanism for setting and maintaining an element in a position corresponding to that occupied by said first mentioned member when the engine is revolving at the speed which it is desired to have it maintain during the ascent of the vehicle, and means for setting and simultaneously maintaining another element in a position corresponding to that occupied by said first mentioned member when the engine is revolving at the speed which it is desired to have it maintain during the descent of the vehicle.

9. In an engine-propelled dirigible vehicle altitude control mechanism including the combination of a member positioned by the engine speed, an electrically conductive member adapted to be displaced by the above mentioned member to assume a different position for each engine speed, two contact plates so arranged that the said conductive member will contact with one plate when the engine speed is below a certain value and with the other when it is above a certain value.

10. In an engine-propelled dirigible vehicle the combination of a member positioned by the engine speed, mechanism actuated thereby adapted to control the vertical steering of the vehicle, means in conjunction with said mechanism for setting and maintaining an element in a position corresponding to that occupied by said first mentioned member when the engine is revolving at the speed which it is desired to have it maintain during horizontal operation of the vehicle, a member positioned by the altitude of the vehicle, and means positioned by the above mentioned element for displacing said last mentioned member.

11. In a dirigible vehicle adapted to be automatically controlled in respect to its vertical movements, the combination of two elements adapted to be displaced by changes in the vertical component of the movement of the vehicle, means adapted to electrically connect one of said elements to a source of electric power when the vehicle is climbing under automatic control, and means adapted to similarly connect the other element when it is similarly descending, two members in conjunction with the former element so arranged that the element will contact with one when the vertical component has an upward value greater than a certain amount and with the other when it has an upward value less than said amount, and two members in conjunction with the latter element so arranged that the element will contact with one when the vertical component has a downward value less than a certain amount and with the other when it has a downward value greater than said amount.

12. In a dirigible vehicle the combination of a shaft rotatably positioned by the inclination of the path of the vehicle to the horizontal, two sets of electrically conductive mechanism supported by said shaft, and each adapted to act as an electric trolley, two plates in conjunction with each trolley, each occupying a portion of the circumference described by the trolley, and so arranged that the trolley will pass from one plate to the other when the vehicle is moving at an inclination predetermined independently for each trolley.

13. In a vertically dirigible vehicle the combination of vertical steering mechanism, a trolley adapted to be positioned by the altitude of the vehicle, and to make contact (while the vehicle is to a given side of a predetermined altitude) with an element displaced by changes in the inclination of the path of the vehicle to the horizontal, two members so arranged that the element will contact with one when the inclination is less than a certain critical amount, and with the other when the inclination is greater than said critical amount, and means actuated by the vertical steering mechanism to displace the two members with respect to the element in a manner adapted to make the passage of the element from one member to the other take place at an inclination varying in proportion to the displacement of the vertical steering mechanism.

14. In a dirigible vehicle, the combination of vertical steering mechanism, an element displaced by changes in the upward vertical component of the movement of the vehicle, two members so arranged that the element will contact with one when such component is less than a certain critical amount and with the other when it is greater than said critical amount, another element similarly displaced by changes in the downward vertical component of the movement of the vehicle, two members so arranged that this latter element will contact with one when such component is greater than a certain critical amount and with the other when it is less than said critical amount, and means actuated by the vertical steering mechanism to displace the two pairs of members mentioned with respect to their respective elements in a manner adapted to vary, in proportion to the displacement of the vertical steering mechanism, the values of the respective vertical components required to effect the above described passage of each of the above mentioned elements from one of their respective members to the other.

15. In a dirigible vehicle, the combination of an elevator, an instrument having a pivotally rotatable shaft displaced by changes in the inclination of the path of the vehicle to the horizontal, a trolley moving in unison with said shaft, two contact plates each occupying a portion of the circumference described by said trolley, means for setting the insulated junction of the two contact plates at the trolley position corresponding to the desired inclination of the path of the vehicle, and means actuated by the elevator and adapted to produce an angular displacement of the contact plates with respect to the instrument and thereby alter, in proportion to the displacement of the elevator, the inclination of the path of the vehicle required to bring the trolley to the insulated junction of the two plates.

16. In a dirigible vehicle, the combination of automatic vertical steering mechanism, a steering element actuated thereby and adapted to act as a vertical rudder, an indicator adapted to be displaced by changes in the inclination of the path of the vehicle to the horizontal indicator, mechanism in conjunction therewith for setting an element at a position corresponding to the desired path inclination, a member mechanically constrained to move in proportion to the movement of the steering element, a lever actuated thereby, a member actuated by the lever and adapted to cause a relative displacement of the last-mentioned element set with respect to the indicator, and means for moving the pivotal axis of the lever so as to alter the relative amount of movement transmitted to the last mentioned member.

17. In a dirigible vehicle, the combination of vertical steering mechanism, a member automatically movable in response to change in the inclination of the path of the vehicle, two sets of electrically conductive mechanism actuated by said member and adapted to act as electric trolleys, a set of two contact plates in conjunction with each trolley so arranged that the trolley will pass from one plate to the other when the vehicle is moving on a path having a specific inclination determined by the positioning of the plates relative to the trolley, means for independently positioning each set of plates to correspond to different inclinations of the path of the vehicle, mechanism for selectively making electrical connection to one or the other of the trolleys, and means adapted to displace the vertical steering mechanism in one direction or the other, depending upon which plate the operative trolley is in contact with.

18. In an engine-propelled dirigible vehicle the combination of a member positioned by the engine speed, two electric trolleys mechanically actuated by said member and selectively energized by a member positioned by the altitude of the vehicle, and mechanism actuated by said electric trolleys and adapted to automatically control the vertical steering of the vehicle.

19. In a dirigible vehicle mechanism adapted to control vertical steering including an element positioned by the altitude of the vehicle and mechanism actuated thereby, an element positioned by the inclination of the path of the vehicle to the horizontal and mechanism actuated thereby, a rudder for controlling vertical steering, means actuated by the second element mentioned to produce a displacement of the first mentioned mechanism with respect to the first mentioned element, and means actuated by the rudder to produce a displacement of the last mentioned mechanism with respect to the last mentioned element.

20. In a dirigible vehicle the combination of an electrically conductive member positioned by the elevation of the vehicle, a conductor adapted to contact with said member whenever the vehicle is below a chosen elevation, another conductor adapted to contact with it whenever the vehicle is above said elevation, and a member adapted to be displaced by changes in the inclination of the path of the vehicle and to in turn displace the two conductors above mentioned with respect to the first mentioned conductive member.

21. In an engine-propelled vehicle the combination of an element positioned by the altitude of the vehicle, two conductors adapted to contact with said element, the one when the vehicle is below a chosen elevation and the other when it is above said elevation, a member adapted to be positioned by the speed of the engine, means actuated thereby to displace the two conductors above mentioned with respect to the element, two other conductors adapted to contact with the said member, the one when the engine speed is less than a chosen value and the other when it is greater, an elevator, and means actuated thereby for displacing said two last mentioned conductors with respect to the member which is positioned by the engine speed.

22. In a dirigible vehicle, the combination of an element adapted to be displaced with respect to its mounting by each change in altitude of the vehicle in a direction corresponding to such change and in an amount representative of the amount thereof, a member adapted to be acted upon by said element, another member displaced by changes in the inclination of the path of the vehicle, and means connecting said two members so that displacements of the latter member will produce displacements of the former member with respect to the mounting of the element.

23. In an engine-propelled dirigible vehicle altitude control mechanism including an element adapted to be automatically positioned with respect to engine speed, a member adapted to be actuated by said element in its movements over a limited range of engine speeds, and mechanism adapted to vary the range of engine speeds within which said actuation takes place.

24. In a dirigible vehicle the combination of an elevator adapted to effect vertical steering, a member adapted to be displaced by changes in the inclination of the path of the vehicle, another member adapted to cooperate therewith in controlling the movements of the elevator so as to bring the vehicle onto a path having a desired inclination to the horizontal, means actuated by the elevator to produce a relative displacement of said two members proportional to the displacement of the elevator from its neutral position, and means adapted to vary the ratio of one displacement to the other.

25. In an engine-propelled vehicle, the combination of an elevator adapted to effect vertical steering, an element positioned by the engine speed and members cooperating therewith adapted to be relatively displaced by the elevator in proportion to the movement thereof, and means adapted to alter the smoothness and time characteristics of the steering by altering the amount of such displacement per unit of movement of the elevator.

26. In a dirigible vehicle the combination of a member positioned by the altitude of the vehicle, two elements arranged so that said member will contact with the one when the vehicle is above a selected altitude and with the other when below said altitude, two members positioned by changes in the inclination of the path of the vehicle, and means electrically connecting said two members, respectively, to the two elements above mentioned.

27. In an airplane the combination of an adjustable tail-plane, a rotatable shaft and mechanism actuated thereby for positioning the tail-plane, a threaded shaft adapted to be rotated by the above mentioned shaft, a nut rotatably restrained and longitudinally slidable meshing therewith, an indicator actuated by said nut and arranged to be visible to the operator of the airplane, and a scale in conjunction with said indicator adapted to register the incidence angle of the tail-plane.

28. In a dirigible vehicle the combination of a rotatably supported surface for changing the inclination of the path of the vehicle adapted to be restrained in neutral or displaced therefrom by operator of the vehicle at his option, another rotatably supported surface adapted to automatically control the inclination, and a member movable by the operator into one position to institute movement of the surface in one direction, into a second position to institute movement of the surface in the opposite direction, and into a third position to render operative the automatic control means.

29. In a dirigible vehicle the combination of a surface adapted to be positioned so as to effect changes in the direction of movement of the vehicle, a servo motor and mechanism actuated thereby for moving said surface, means for automatically actuating the servo motor to position the surface, and a member movable by the operator of the vehicle into one position to set up operation of the servo motor in one direction, into a second position to set up operation in the opposite direction, and into a third position to render operative the means for automatically actuating the servo motor.

30. In a dirigible craft the combination of two members relatively positioned with respect to the altitude of the craft, an element positioned with respect to the inclination of the path of the craft to the horizontal, means connecting the element to one of the first mentioned members so that each displacement of the element will effect a relative displacement of said two members, and means for altering at will the proportionate amount of such relative displacement.

31. In a dirigible craft the combination of two members relatively positioned with respect to the altitude of the craft, an element positioned with respect to the inclination of the path of the craft to the horizontal, and means connecting the element to one of the first mentioned members so that each displacement of the element will effect a relative displacement of said two members.

32. In a dirigible vehicle, mechanism qualitatively and quantitatively responsive to changes in the altitude thereof, means controlled by the qualtitative response thereof for varying the inclination of the path of the vehicle, and means controlled by the quantitative response thereof for proportionately limiting the effect of said first means on the inclination of said path.

33. In a dirigible vehicle, mechanism settable to a representation of a given altitude, mechanism automatically set in response to changes in altitude, means responsive to a divergence in the setting of said mechanisms for varying the inclination of the path of the vehicle, and means quantitatively controlled by the amount of such divergence for proportionately limiting the effect of said first means upon the inclination of said path.

34. In a dirigible vehicle, mechanism settable to a representation of a given altitude, mechanism automatically set in response to changes in altitude, means responsive to a divergence in the setting of said mechanisms for varying the inclination of the path of the vehicle, and means quantitatively controlled by the amount of such divergence for constantly proportioning the effect of said first means upon the inclination of said path, to the absolute variance from the set altitude.

35. In a dirigible vehicle, the combination of a member automatically positioned in response to departure of the vehicle from a fixed altitude, an element adapted to cooperate with said member to direct the vehicle toward said fixed altitude, and means responsive to changes in the inclination of the path of the vehicle for varying the working relation of said member and said element.

36. In a dirigible vehicle, the combination of a member automatically positioned in response to departure of the vehicle from a fixed altitude, an element adapted to cooperate with said member to direct the vehicle toward said fixed altitude, and means responsive to changes in the inclination of the path of the vehicle for limiting the effect of said member and said element upon the inclination of the path of the vehicle.

37. In a dirigible vehicle, the combination of a member automatically positioned in response to changes in altitude, an element adapted to cooperate with said member to effect changes in the inclination of the path of the vehicle, means settable to a representation of a desired altitude for varying the relative adjustment of said member and said element, and means automatically responsive to changes in the inclination of the path of the vehicle for varying the relative adjustment of said member and said element.

38. In a dirigible vehicle, the combination of a member automatically positioned in response to changes in altitude, an element adapted to cooperate with said member to effect changes in the inclination of the path of the vehicle, means settable to a representation of a desired altitude for varying the relative adjustment of said member and said element, and means automatically responsive to changes in the inclination of the path of the vehicle for varying the relative adjustment of said member and said element while said first named means is being set.

39. In a dirigible vehicle, the combination of a member automatically positioned in response to changes in altitude, an element adapted to cooperate with said member to effect changes in the inclination of the path of the vehicle, means settable to a representation of a desired altitude for varying the relative adjustment of said member and said element, and means automatically responsive to changes in the inclination of the path of the vehicle for limiting the effect of said member and said element upon the inclination of the path of the vehicle.

40. In a dirigible vehicle, the combination of a member automatically positioned in response to changes in altitude, an element adapted to cooperate with said member to effect changes in the inclination of the path of the vehicle, means settable to a representation of a desired altitude for varying the relative adjustment of said member and said element, and means automatically responsive to changes in the inclination of the path of the vehicle for limiting the effect of said member and said element upon the inclination of the path of the vehicle while said first named means is being set.

In testimony whereof I affix my signature.

HAROLD T. AVERY.

CERTIFICATE OF CORRECTION.

Patent No. 1,860,402.  May 31, 1932.

HAROLD T. AVERY.

It is hereby certified that error appears in the printed specification of the above numbered patent requiring correction as follows: Page 4, line 34, for the article "a" read at; page 5, line 108, for "conductor" read conductive; page 11, line 93, claim 16, strike out the word "indicator", and line 101, strike out the word "set"; and that the said Letters Patent should be read with these corrections therein that the same may conform to the record of the case in the Patent Office.

Signed and sealed this 12th day of July, A. D. 1932.

(Seal)

M. J. Moore,
Acting Commissioner of Patents.

adapted to cooperate with said member to effect changes in the inclination of the path of the vehicle, means settable to a representation of a desired altitude for varying the relative adjustment of said member and said element, and means automatically responsive to changes in the inclination of the path of the vehicle for limiting the effect of said member and said element upon the inclination of the path of the vehicle while said first named means is being set.

In testimony whereof I affix my signature.

HAROLD T. AVERY.

CERTIFICATE OF CORRECTION.

Patent No. 1,860,402.    May 31, 1932.

HAROLD T. AVERY.

It is hereby certified that error appears in the printed specification of the above numbered patent requiring correction as follows: Page 4, line 34, for the article "a" read at; page 5, line 108, for "conductor" read conductive; page 11, line 93, claim 16, strike out the word "indicator", and line 101, strike out the word "set"; and that the said Letters Patent should be read with these corrections therein that the same may conform to the record of the case in the Patent Office.

Signed and sealed this 12th day of July, A. D. 1932.

(Seal)

M. J. Moore,
Acting Commissioner of Patents.

CERTIFICATE OF CORRECTION.

Patent No. 1,860,402.  May 31, 1932.

HAROLD T. AVERY.

It is hereby certified that error appears in the printed specification of the above numbered patent requiring correction as follows: Page 4, line 34, for the article "a" read at; page 5, line 108, for "conductor" read conductive; page 11, line 93, claim 16, strike out the word "indicator", and line 101, strike out the word "set"; and that the said Letters Patent should be read with these corrections therein that the same may conform to the record of the case in the Patent Office.

Signed and sealed this 12th day of July, A. D. 1932.

(Seal)

M. J. Moore,
Acting Commissioner of Patents.